United States Patent
Bates et al.

(10) Patent No.: US 7,693,030 B2
(45) Date of Patent: *Apr. 6, 2010

(54) DUAL-PATH OPTICAL RECORDING MEDIA AND AN APPARATUS FOR ACCESSING THEREOF

(75) Inventors: Allen K. Bates, Tucson, AZ (US); Nils Haustein, Soergenloch (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 311 days.

This patent is subject to a terminal disclaimer.

(21) Appl. No.: 11/735,047

(22) Filed: Apr. 13, 2007

(65) Prior Publication Data

US 2008/0256566 A1    Oct. 16, 2008

(51) Int. Cl.
   *G11B 7/24* (2006.01)
(52) U.S. Cl. .................... 369/275.1; 369/103
(58) Field of Classification Search .............. None
   See application file for complete search history.

(56) References Cited

U.S. PATENT DOCUMENTS

| | | | | |
|---|---|---|---|---|
| 6,163,409 | A * | 12/2000 | Uchiyama et al. | 359/634 |
| 6,211,511 | B1 * | 4/2001 | Shih et al. | 250/214 R |
| 6,343,058 | B1 * | 1/2002 | Akiyama et al. | 369/112.1 |
| 6,480,455 | B2 * | 11/2002 | Takahashi | 369/112.22 |
| 6,870,805 | B1 | 3/2005 | Arai et al. | |
| 7,139,109 | B2 * | 11/2006 | Mukawa | 359/22 |
| 2004/0032816 | A1 | 2/2004 | Hofmann et al. | |
| 2005/0200926 | A1 | 9/2005 | Aoki et al. | |
| 2006/0028960 | A1 * | 2/2006 | Hatano et al. | 369/112.01 |
| 2006/0265669 | A1 * | 11/2006 | Lee | 715/818 |
| 2008/0253273 | A1 * | 10/2008 | Bates et al. | 369/284 |
| 2009/0081561 | A1 * | 3/2009 | Kamo | 430/2 |

FOREIGN PATENT DOCUMENTS

| EP | 1701341 A1 | 9/2006 |
|---|---|---|
| EP | 1912102 A1 | 4/2008 |

(Continued)

OTHER PUBLICATIONS

Search Report received for International Patent Application No. PCT/EP2008/054419, mailed Jul. 25, 2008.

(Continued)

*Primary Examiner*—Joseph H Feild
*Assistant Examiner*—Henok G Heyi
(74) *Attorney, Agent, or Firm*—Griffiths & Seaton PLLC

(57) ABSTRACT

A dual-path optical recording medium and an apparatus for accessing such are disclosed. The dual-path optical recording medium includes a substrate, an intermediate recording layer, a holographic recording layer and a dichronic mirror layer. The intermediate recording layer is a rewritable data storage layer with a relatively low storage capacity. The holographic recording layer is a write-once data storage layer with a relatively high storage capacity. The dichronic mirror layer is located between the holographic recording layer and the intermediate recording layer. The apparatus for accessing the dual-path optical recording medium includes a first light module capable of generating a first laser light, and a second light module capable of generating a second laser light.

27 Claims, 3 Drawing Sheets

FOREIGN PATENT DOCUMENTS

| | | |
|---|---|---|
| JP | 10-208255 | 8/1998 |
| JP | 10-293655 | 11/1998 |
| WO | 03032300 A2 | 4/2003 |
| WO | 2006114835 A1 | 11/2006 |
| WO | 2008075350 A1 | 6/2008 |

OTHER PUBLICATIONS

"Multilayer Thin-Film Holographic Storage: a New Approach," Optimal Optik Ltd., http://www.optimal-optik.hu/MULTILAYER_POSTER_OPTIMAL.pdf, available at least as early as Oct. 2, 2006 per the Internet Archive at www.archive.org, 11 pages.

S. Homan et al., "High-Capacity Optical Storage using Multiple Wavelengths, Multiple Layers and Volume Holograms," IEEE, Electronics Letters, Apr. 13, 1995, vol. 31, No. 8, pp. 621-623.

* cited by examiner

DUAL-PATH OPTICAL RECORDING MEDIA AND AN APPARATUS FOR ACCESSING THEREOF

CROSS REFERENCE TO RELATED APPLICATIONS

The present application is related to Ser. No. 11/735,058, entitled "COMPUTER PROGRAM PRODUCT FOR CONTROLLING AN APPARATUS FOR ACCESSING DUAL-PATH OPTICAL RECORDING MEDIA," filed on even date, which is assigned to the assignee of the present application.

BACKGROUND OF THE INVENTION

1. Technical Field

The present invention relates to optical recording media in general, and more particularly, to dual-path optical recording media. Still more particularly, the present invention relates to a method and apparatus for accessing dual-path optical recording media.

2. Description of Related Art

In recent years, optical recording media with a large storage capacity have been developed for storing various types of data, including textual, graphics and voice. An optical recording medium is typically provided with a spiral or concentric track on one surface to allow laser beams to be irradiated along the track when data recording or retrieval is being performed. A track is further divided into multiple sectors that become the minimum unit for recording information.

With the Digital Versatile Disk (DVD) technology, data can be recorded onto an optical recording medium via a light modulation recording method for modulating the intensity of a laser beam irradiated on a track onto which data are to be recorded. There are many types of optical recording media, such as a phase change type optical disc, an organic pigment type optical disc, a magneto-optical disc, holographic media and the like.

SUMMARY OF THE INVENTION

The present disclosure provides a new type of optical recording media and an apparatus for accessing such optical recording media. In accordance with a preferred embodiment of the present invention, a dual-path optical recording medium includes a substrate, an intermediate recording layer, a holographic recording layer and a dichronic mirror layer. Having been stamped into one surface of the substrate to provide lands and grooves, the intermediate recording layer is a rewritable data storage layer with a relatively low storage capacity. The holographic recording layer is preferably a write-once data storage layer with a relatively high storage capacity, but may be rewritable. The dichronic mirror layer is located between the holographic recording layer and the intermediate recording layer.

Data are written into the holographic recording layer in the form of a hologram. Data can be written to the holographic recording layer by a first laser light having a wavelength of approximately 405 nm or 532 nm. The dichronic mirror layer is reflective to the first laser light. Data can be written to the intermediate recording layer via a second laser light having a wavelength of approximately 680 nm. The intermediate recording layer includes a plurality of open hologram segments for storing hologram segments. The intermediate recording layer includes an open hologram segment directory for tracking hologram segments that have been opened. The intermediate recording layer includes a module for storing policies that dictates the closing of any of the open hologram segments.

A data recording system for accessing a dual-path optical recording medium includes a host, a first logical unit number (LUN) interface, a second LUN interface, a first light module, and a second light module. The first light module capable of generating a first laser light is coupled to the host via the first LUN interface. The second light module capable of generating a second laser light is coupled to the host via the second LUN interface.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
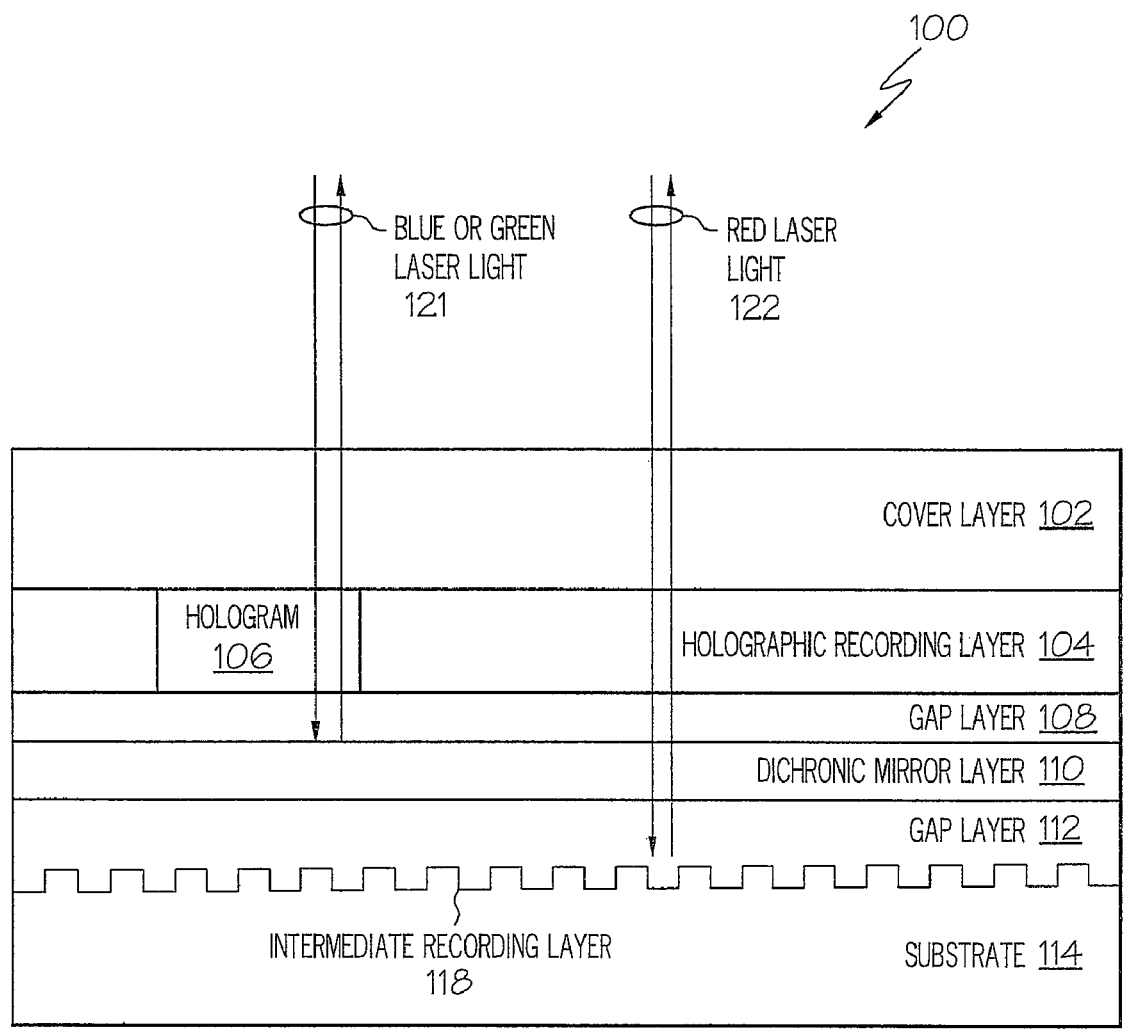
FIG. 1 is a cross-sectional diagram of a dual-path optical recording medium, in accordance to a preferred embodiment of the present invention.

Referring now to the drawings, and specifically to FIG. 1, there is depicted a cross-sectional diagram of a dual-path optical recording medium, in accordance with a preferred embodiment of the present invention. As shown, a dual-path optical recording medium 100 includes a substrate 114, an intermediate recording layer 118, a gap layer 112, a dichronic mirror layer 110, a gap layer 108, a holographic recording layer 104, and a transparent cover layer 102. Holographic recording layer 104 and intermediate recording layer 118 are two separate recording layers of optical recording medium 100. Holographic recording layer 104 is preferably a write-once data storage layer having a relatively high storage capacity but it may be rewritable. In contrast, intermediate recording layer 118 is a rewritable data storage layer having a relatively low storage capacity. Being coated with a phase-change material that is commonly used in conventional Digital Versatile Disks (DVDs), intermediate recording layer 118 is stamped into one surface of substrate 114 to provide lands and grooves.

Data can be written into holographic recording layer 104 in the form of a hologram, such as a hologram 106, by a first laser light 121 having a wavelength of either 405 nm (blue) or 532 nm (green). Dichronic mirror layer 110 selectively reflects first laser light 121 such that first laser light 121 does not reach intermediate recording layer 118. For the holography write technology, as known in the art, a laser light beam is split into two parts, a data beam and a reference beam. The data beam is encoded with data via a spatial light modulator, and the encoded data beam interferes with the reference beam to produce an interference pattern that is stored on an optical recording medium as a hologram. The hologram can subsequently be read by illuminating the hologram with the reference beam alone without need of the spatial light modulator. For simplicity, reference beam is shown in FIG. 1 as first laser light 121.

On the other hand, dichronic mirror layer 110 is selectively transparent to a second laser light 122 having a wavelength of 680 nm (which is the same wavelength of a laser light for writing data to conventional DVDs). Thus, second laser light 122 can pass through dichronic mirror layer 110 for writing data to (or reading data from) intermediate recording layer 118.

In addition, intermediate recording layer 118 is reflective, and second laser light 122 can be reflected back to a holographic disk drive (not shown). Thus, second laser light 122 can also be employed as a servo laser by using the lands and grooves of intermediate recording layer 118 to assist a servo of a holographic disk drive to track during the writing and reading of a hologram, such as hologram 106, in holographic recording layer 104. FIG. 1 is a cross-sectional illustration of optical recording media 100 that spins around a Z-axis, and the lands and grooves of intermediate recording layer 118 about, or are concentric with, the Z-axis.

Figure 2:
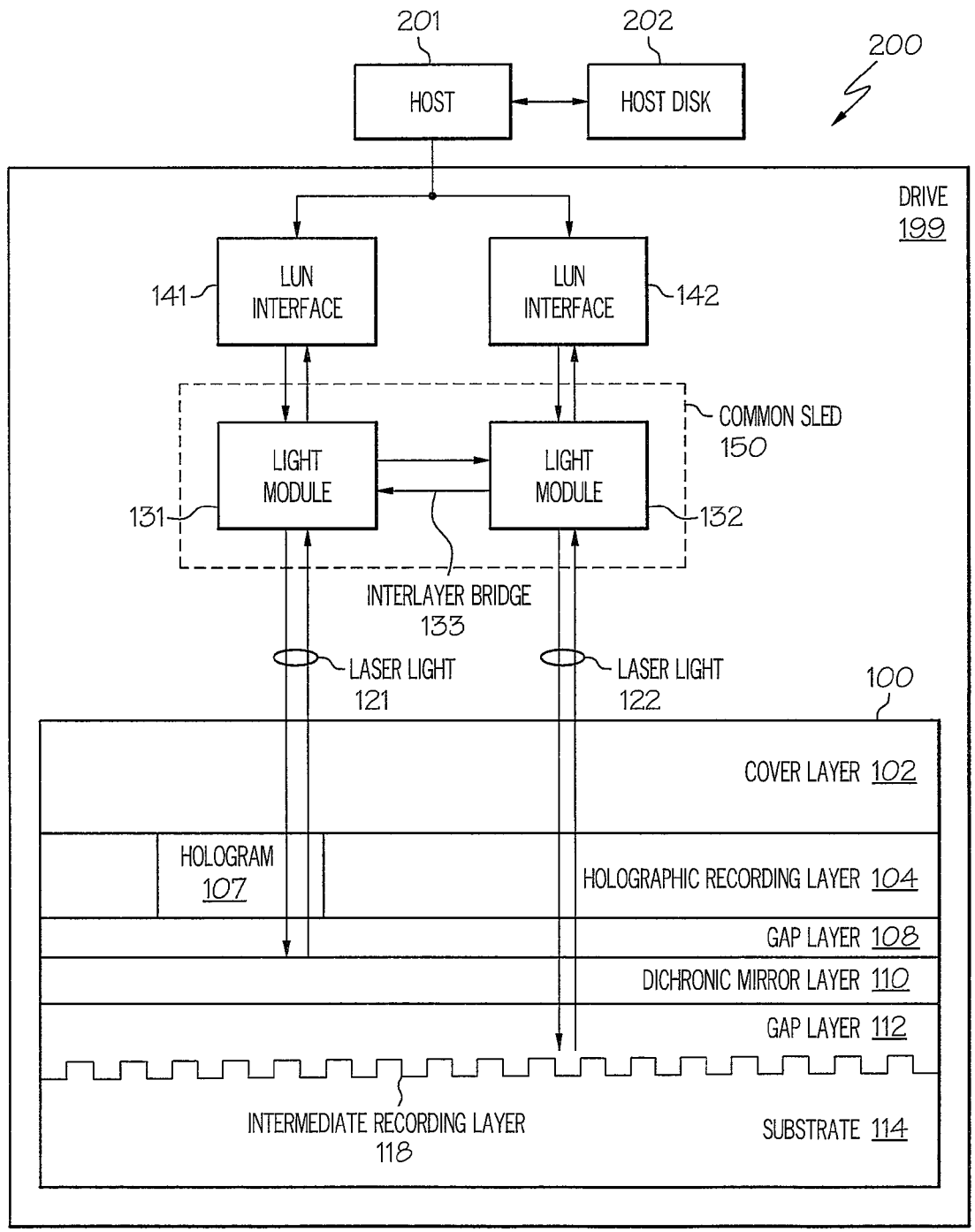
FIG. 2 is a block diagram of a data recording system capable of reading and writing data to and from the optical recording medium from FIG. 1, in accordance with a preferred embodiment of the present invention.

With reference now to FIG. 2, there is illustrated a block diagram of a data recording system capable of reading and writing data to and from optical recording medium 100, in accordance with a preferred embodiment of the present invention. As shown, a data recording system 200 includes a host 201 having a host disk 202, a first logical unit number (LUN) interface 141, a second LUN interface 142, a first laser light module 131 and a second laser light module 132. First laser module 131 and second laser module 132 are both located on a common sled (i.e., seek mechanism) 150. First laser light module 131 and second laser light module 132 interface with host 201 via first LUN interface 141 and second LUN interface 142, respectively. First laser light module 131 provides first laser light 121 to write (or read) holograms, such as a hologram 107, within holographic recording layer 104. Second laser light module 132 provides second laser light 122 to write (or read) data within intermediate recording layer 118.

Data can be moved from intermediate recording layer 118 to holographic recording layer 104, if necessary, based on frequent changes to the data necessitating the random access. Since first laser module 131 and second laser module 132 communicate with each other via an interlayer bridge 133, data can be removed from intermediate recording layer 118 and be written to holographic recording layer 104 without burdening host 201.

Figure 3:
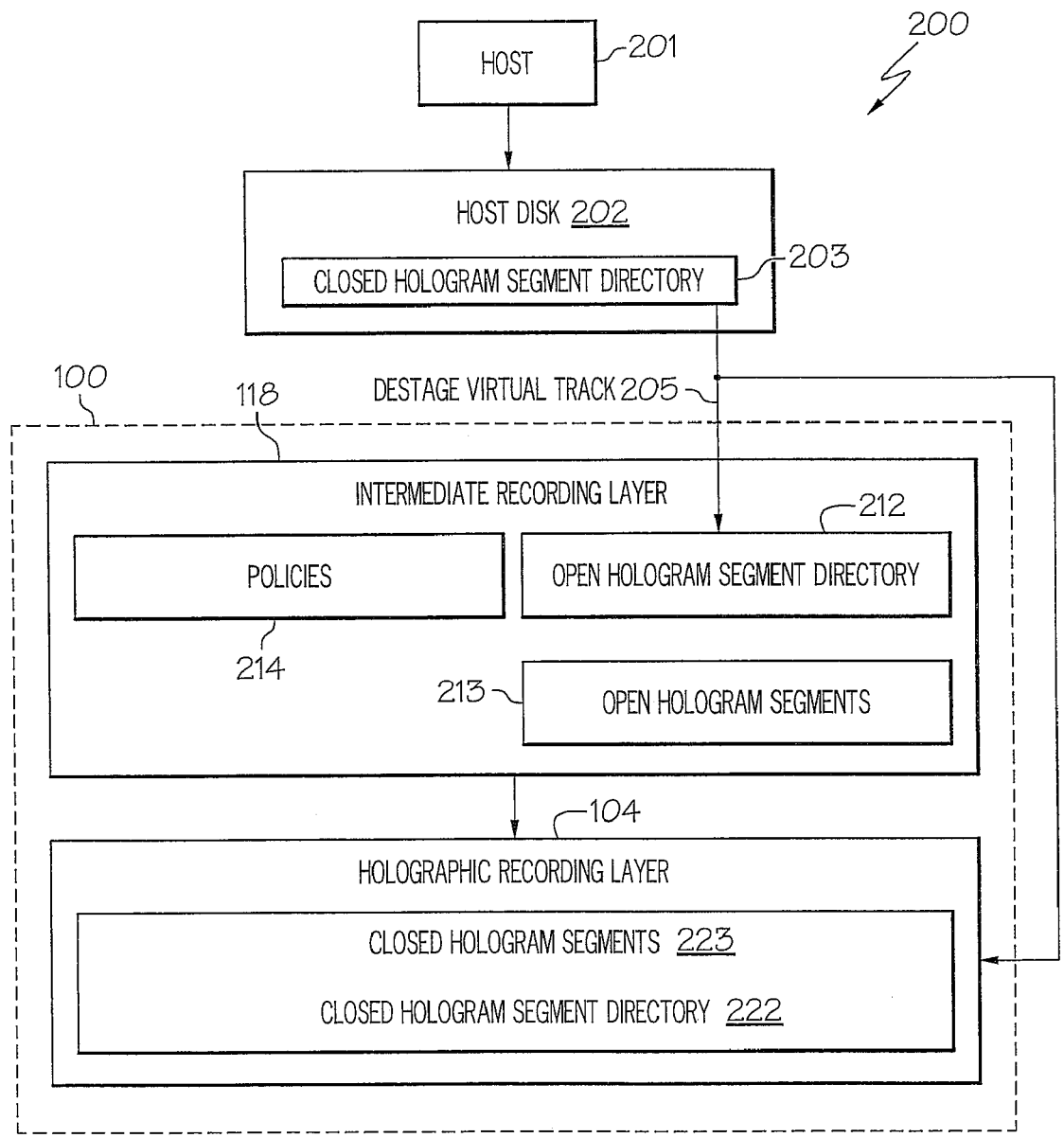
FIG. 3 is a detailed block diagram of various components within the optical recording medium from FIG. 1, in accordance with a preferred embodiment of the present invention.

Referring now to FIG. 3, there is illustrated a detailed block diagram of various components within optical recording medium 100, in accordance with a preferred embodiment of the present invention. As mentioned above, optical recording medium 100 includes holographic recording layer 104 and intermediate recording layer 118. Host 201 can write data to optical recording medium 100 through a destage virtual track 205 using destage operations. A destage operation can be a SCSI write command, a SCSI write command across Fibre Channel, an iSCSI command, a GbEN command, or any other similar command for writing data. Any data destaged by host 201 can be optionally compressed before being written into one of open hologram segments 213 within intermediate recording layer 118. Compressed or uncompressed data for each new destage operation is placed end-on-end with the data from prior destage operations until one of open hologram segments 213 is completely filled. The size of one of open hologram segments 213 is preferably the same as the size of a hologram stored within holographic recording layer 104, or the same size as an integral number of hologram pages within holographic recording layer 104.

Intermediate recording layer 118 can be used as a cache memory for holographic recording layer 104 to store data on a temporary basis. But any data destined for final storage in holographic recording layer 104 will eventually be migrated from intermediate recording layer 118 to holographic recording layer 104 according to a set of user-selectable policies 214.

The transfer of data from intermediate recording layer 118 to holographic recording layer 104 can be registered at host 201 (so host 201 knows where to find the data) by updating a closed holographic segment directory 203 within host disk 202 after the data have been transferred.

An open hologram segment directory 212 is maintained in intermediate recording layer 118 for each one of open holographic segments 213. Open hologram segment directory 212 records which tracks are being stored in open hologram segments 213. After an open holographic 212 and open hologram segments 213 have been closed, both closed hologram segment directory 222 and closed hologram segments 223 are then written to holographic recording layer 104, by passing them across interlayer bridge 133 that serves as a communication path between holographic recording layer 104 and intermediate recording layer 118. Closed holographic directory 222 is also stored in closed holographic directory 203 on host disk 202 so that host 201 knows how to find the respective one of closed holographic segments 223.

Any of open hologram segments 213 can be closed according to policies 214. The hologram segment closing policies under policies 214 may include parameters as follows:

I. A Maximum Time that a Hologram Segment can be Left Open

The hologram segment open time starts when the first data is written to intermediate recording layer 118. If the maximum time is not exceeded, but the open hologram segment 213 is full, the hologram segment can be closed and be written to holographic recording layer 104 from intermediate recording layer 118 via interlayer bridge 133. If the maximum time is exceeded and the open hologram segment 213 is not filled up to the segment capacity limit, the remaining space can be filled with a pad-pattern (i.e., a non-data pattern), and then the hologram segment is closed and the data are written to holographic recording layer 104. Any hologram segment with a pad-pattern is marked "not full" in a closed hologram segment directory 203 within host disk 202 as well as closed hologram segment directory 222 within holographic recording layer 104. Otherwise, the non-data pattern used for padding may also include some error correction code that are capable of providing additional protection to the data in hologram segments.

If new data arrives for a "not full" but closed hologram segment 223, that closed hologram segment 223 is retrieved from holographic recording layer 104 via interlayer bridge 133 to intermediate recording layer 118, to be re-opened. The new data is then appended to the now open hologram segment 213, by overwriting the pad-pattern. The hologram segment is subsequently re-closed when the hologram segment is either completely filled or the maximum time is exceeded again.

This policy might be valuable to the credit card industry, where each credit card user has an open hologram segment for tracking his/her purchases for a given credit card. The open hologram segment is created at the beginning of each billing period or the first charge after the beginning of the billing period, and then closed at the end of that billing period.

II. A Threshold Capacity for Closing a Hologram Segment

If the threshold capacity is exceeded, the hologram segment is closed and data are written to holographic layer 104. The threshold capacity may be specified in holographic pages or in conventional storage units. The threshold of holographic pages is preferred when each holographic page holds a predefined capacity and an integral number of pages is specified as the threshold.

III. A Close Hologram Segment Command Issued by a User

If a hologram segment is not full when a close hologram segment command is issued by a user, the remaining space is padded and new data causes a retrieval of the hologram segment and the new data are appended over the pad-pattern (same steps as policy I). A force closure of open hologram segments 213 may also be invoked in response to a power outage or impending disaster, such as a fire or hurricane.

IV. Only a Limited Number of Open Hologram Segments is Permitted

When too many open hologram segments 213 exist, the least recently used (LRU) hologram segments are closed first, as needed, to allow the creation of new holographic segments. Alternatively, too many open hologram segments 213 can trigger an aggregation of many partially-filled open hologram segments 213 into a few completely filled open hologram segments 213, which then may be closed under Policy I.

V. When Data Compression is Allowed

A variant of this policy is that data in an open hologram segment 213 is not compressed until that hologram segment reaches a capacity threshold, such as 90% filled. Once that threshold has been reached, data are compressed on-demand in order to make room for additional data. This policy is designed to mitigate the amount of padding used in policy I.

VI. Aggregating All Versions of a File in One Hologram Segment

The storage of multiple versions of a file allows a complete historical record of changes made to the file. Thus, this policy is a logical form of holographic write-once-read-many (WORM), where multiple versions of a file are saved rather than overwritten. The advantage of this policy is that all versions are stored in a common location so that a user does not have to engage in multiple accesses of a holographic medium to retrieve different versions. This policy may be valuable for the retention of financial and legal records.

VII. Mirroring Between Hologram Segments

When a file can be mirrored between two hologram segments—for redundant array of independent disk (RAID)-1 emulation, if one hologram segment cannot be read from a holographic medium, the same file can be accessed via the mirrored hologram segment.

VIII. Striping Data Across Multiple Hologram Segments

Information in three or more hologram segments may be spread into RAID stripes with parity stored in one hologram segment for a RAID-3 or RAID-4 emulation, or with parity spread across several hologram segments for a RAID-5 emulation. The closed hologram directory 222 and closed hologram segments 223 can be written into holographic recording layer 104 as a single hologram or a single group of holograms, and the newly closed hologram directory 222 is copied to host 201 in order to update overall hologram segment directory 203 stored within host disk 202. At this point, intermediate recording layer 118 ceases to retain any information about the hologram segment that has just been closed in order to make room for new open segments 213 and open segment directories 212.

More than one policy within policies 214 may be activated simultaneously. Although policies 214 can be executed within host 201, it is preferable for policies 214 to be executed within a drive 199 so that host 201 is not burdened by policy executions.

Data can be written by host 201 separately to intermediate recording layer 118 using second LUN interface 142 (from FIG. 2) or to holographic recording layer 104 using first LUN interface 141 (from FIG. 2) via destage virtual track 205. For example, fossilized (such as quiescent or dormant) data may be written directly to holographic recording layer 104, bypassing intermediate recording layer 118. Data which is active and may be frequently changed may be first written to intermediate recording layer 118, which then forms a cache for holographic recording layer 104. Once an activity has deemed to be quiescent, the data may be migrated from intermediate recording layer 118 to holographic recording layer 104, via interlayer bridge 133.

Alternately, if there is a problem writing closed hologram segments 223 from host 201 directly to holographic layer 104, that data may be temporarily written as open hologram segments 213 from LUN interface 141 across interlayer bridge 133 to intermediate recording layer 118. Later, once the problem is resolved, the data may be migrated to the original destination of holographic recording layer 104, as closed hologram segments 223, again by use of interlayer bridge 133.

As has been described, the present invention provides a dual-path optical recording medium, and an apparatus and methods for accessing such.

While an illustrative embodiment of the present invention has been described in the context of a fully functional computer system with installed software, those skilled in the art will appreciate that the software aspects of an illustrative embodiment of the present invention are capable of being distributed as a computer program product in a variety of forms, and that an illustrative embodiment of the present invention applies equally regardless of the particular type of signal bearing media used to actually carry out the distribution. Examples of signal bearing media include recordable type media such as floppy disks, hard drives, compact discs, integrated circuit device and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A dual-path optical recording medium configured to be coupled to a host computer including a data directory, comprising: a substrate; an intermediate recording layer stamped into one surface of said substrate to provide lands and grooves, wherein said intermediate recording layer is a rewritable cache data storage layer having a relatively low storage capacity and configured to temporarily store data as open holographic segments; a holographic recording layer, wherein said holographic recording layer is a write-once data storage layer having a relatively high storage capacity; and a dichroic mirror layer located between said holographic recording layer and said intermediate recording layer, wherein: said temporarily stored data is transferred to said holographic layer as closed holographic segments in accordance with one or more predefined policies, and said closed holographic segments are registered in said data directory.

2. The recording medium of claim 1, wherein data are written into said holographic recording layer in the form of a hologram.

3. The recording medium of claim 1, wherein data can be written to said holographic recording layer by a first laser light having a wavelength of approximately 405 nm or 532 nm.

4. The recording medium of claim 3, wherein said dichroic mirror layer is reflective to said first laser light.

5. The recording medium of claim 1, wherein data can be written to said intermediate recording layer via a second laser light having a wavelength of approximately 680 nm.

6. The recording medium of claim 1, wherein said intermediate recording layer includes a plurality of open hologram segments for storing hologram segments.

7. The recording medium of claim 6, wherein said intermediate recording layer includes an open hologram segment directory for tracking hologram segments that have been opened.

8. The recording medium of claim 7, wherein said intermediate recording layer includes a module for storing policies that govern the closing of any of said open hologram segments.

9. The recording medium of claim 6, wherein said holographic recording layer includes a plurality of closed hologram segments for storing said open hologram segments after they have been closed.

10. The recording medium of claim 7, wherein said holographic recording layer includes a closed hologram segment directory for storing said open hologram segment directory after it has been closed.

11. An apparatus for accessing a dual-path optical recording medium, said apparatus comprising:
a first logical unit number (LUN) interface and a second LUN interface;
a first light module, coupled to said first LUN interface, for generating a first laser light;
a second light module, coupled to said second LUN interface, for generating a second laser light;
a common sled upon which said first and second light modules are located.

12. The apparatus of claim 11, wherein said first laser light has a wavelength of approximately 405 nm or 532 nm.

13. The apparatus of claim 11, wherein said second laser light has a wavelength of approximately 680 nm.

14. The apparatus of claim 11, wherein said apparatus further includes an interlayer bridge connected between said first and second light modules for allowing communications between said first and second laser modules.

15. The apparatus of claim 11, wherein said dual-path optical recording medium includes
a substrate;
an intermediate recording layer located on one surface of said substrate to be accessed by said second laser light, wherein said intermediate recording layer is a cache data storage layer; and
a holographic recording layer to be accessed by said first laser light.

16. The apparatus of claim 15, wherein said dual-path optical recording medium further includes a dichroic mirror layer located between said holographic recording layer and said intermediate recording layer.

17. The apparatus of claim 15, wherein said intermediate recording layer is a rewritable data storage layer having a relatively low storage capacity.

18. The apparatus of claim 15, wherein said holographic recording layer is a write-once data storage layer having a relatively high storage capacity.

19. The apparatus of claim 15, wherein said interlayer bridge allows data to be transferred directly from one recording layer to another recording layer of said dual-path optical recording medium without going through a host computer.

20. A data recording system comprising:
a host computer; and
a drive for accessing a dual-path optical recording medium, wherein said drive includes
a first logical unit number (LUN) interface and a second LUN interface;
a first light module coupled to said host via said first LUN interface, wherein said first light module generates a first laser light;
a second light module coupled to said host via said second LUN interface, wherein said second light module generates a second laser light;
a common sled upon which said first and second light modules are located.

21. The data recording system of claim 20, wherein said first laser light has a wavelength of approximately 405 nm or 532 nm.

22. The data recording system of claim 20, wherein said second laser light has a wavelength of approximately 680 nm.

23. The data recording system of claim 20, wherein said drive further includes an interlayer bridge located between said first and second light modules for allowing communications between said first and second laser modules.

24. The data recording system of claim 20, wherein said dual-path optical recording medium includes
a substrate;
an intermediate recording layer located on one surface of said substrate to be accessed by said second laser light, wherein said intermediate recording layer is a cache data storage layer; and
a holographic recording layer to be accessed by said first laser light.

25. The data recording system of claim 24, wherein said dual-path optical recording medium further includes a dichroic mirror layer located between said holographic recording layer and said intermediate recording layer.

26. The data recording system of claim 24, wherein said intermediate recording layer is a rewritable data storage layer having a relatively low storage capacity, and said holographic recording layer is a write-once data storage layer having a relatively high storage capacity.

27. The data recording system of claim 24, wherein said interlayer bridge allows data to be transferred directly between said holographic recording layer and said intermediate recording layer without going through said host computer.

* * * * *